Feb. 14, 1950          C. K. GRAVLEY          2,497,665
PIEZOELECTRIC DEVICE

Filed Feb. 7, 1945          2 Sheets-Sheet 1

INVENTOR.
CHARLES K. GRAVLEY
BY P. R. Goldsborough
ATTORNEY

Feb. 14, 1950     C. K. GRAVLEY     2,497,665
PIEZOELECTRIC DEVICE
Filed Feb. 7, 1945     2 Sheets-Sheet 2
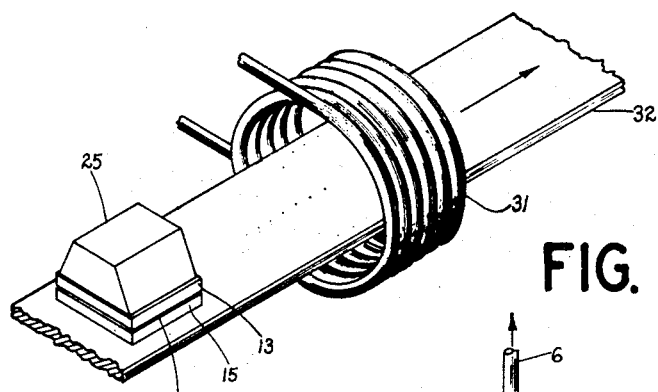
FIG. 7
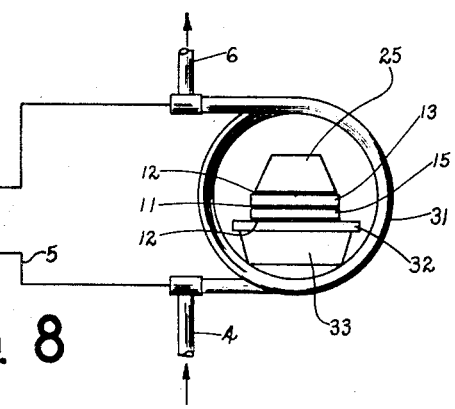
FIG. 8
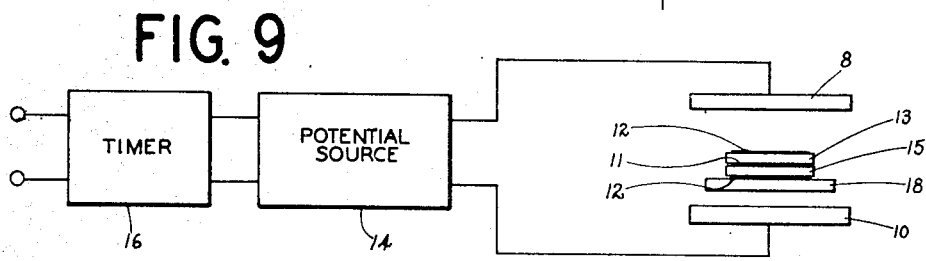
FIG. 9
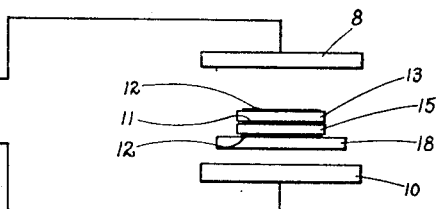
FIG. 10
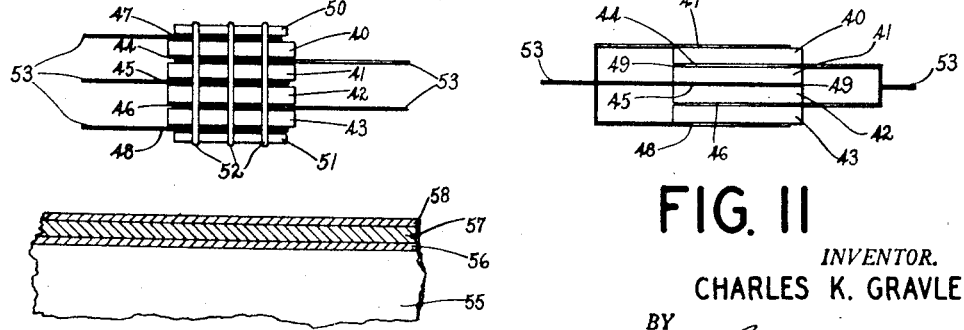
FIG. 11
FIG. 12
INVENTOR.
CHARLES K. GRAVLEY
BY
Elbus J. Hyde
ATTORNEY Patented Feb. 14, 1950

2,497,665

UNITED STATES PATENT OFFICE 2,497,665

PIEZOELECTRIC DEVICE

Charles K. Gravley, Cleveland Heights, Ohio, assignor to The Brush Development Company, Cleveland, Ohio, a corporation of Ohio Application February 7, 1945, Serial No. 576,561

5 Claims. (Cl. 171—327)

This invention relates to the electroding of piezoelectric crystals and, more particularly, to methods of fabricating expander elements and elements of the type constituted by a single crystal section affixed to a non-piezoelectric supporting and restraining plate or to a flexible electrode, as well as to elements of the type constituted by two or more crystal sections affixed to each other for mutual restraint and provided with suitable electrodes. Transducer elements of the last mentioned type are called "multiplate flexing elements."

Inasmuch as this invention relates primarily to a method of affixing a supporting plate or an electrode to a piezoelectric crystal section, and to the affixing to each other of a plurality of crystal sections, no reference will be made herein to the theory underlying such devices nor to the specific orientation of the sections with respect to the crystallographic axes of the mother crystals. Such information, if it is desired, may be found in the United States reissue patents to C. B. Sawyer, Re. 20,213 and Re. 20,680, as well as in many other patents well known to those skilled in the art.

Previous to this invention, a number of different procedures had been advocated for causing electrodes to adhere tightly to one or more faces of a Rochelle salt section and for causing two or more sections to adhere to each other to form what might generally be termed a "polymorph."

It was usually customary to provide a crystal section with electrodes either by spraying colloidal graphite on the faces thereof, as disclosed in the United States patent to A. L. W. Williams, No. 2,106,143, or by affixing metallic foil to the faces, substantially as shown in the United States patent to C. B. Sawyer, No. 1,995,257. After electroding, the sections were usually joined to each other by employing a cement formed by melting Rochelle salt in its own water of crystallization.

As will be apparent from a consideration of the patents cited, the electroding and subsequent steps in the method of fabricating a multiplate flexing element involved a number of manual operations and, consequently, the labor cost was quite high in proportion to the cost of the raw materials involved.

An object of this invention, therefore, is to provide a method of fabricating a piezoelectric transducer whereby the number of steps required shall be reduced and, in consequence of the reduction, the labor cost shall be diminished.

Another object is to provide a method, of the type described, whereby the electroding of the crystal sections and the joining together of a plurality of sections may be accomplished simultaneously at a single operation.

Another object is to provide a method of joining together two sections of piezoelectric material without employing cement or like material.

Another object is to provide a method of manufacturing a multiplate flexing element of the type constituted by a section of piezoelectric material affixed to a flexible restraining plate of non-piezoelectric material such as beryllium or other electrically conducting metal or the like.

A further object is to provide a method whereby the intermediate electrode of a multiplate flexing element may be caused to adhere simultaneously to both inner surfaces of the two crystal sections and the said sections, in effect, may be firmly joined each to the other.

An additional object of the invention is to provide an improved piezoelectric transducer element that shall be devoid of cement.

Another object of my invention is to provide a new type of electrode for a piezoelectric crystal element.

Briefly, in accordance with this invention, a conductive electrode is welded, so to speak, to the surface of a section of fusible piezoelectric material, such as Rochelle salt or primary ammonium phosphate or the like, by causing the said electrode itself to be heated momentarily to a temperature sufficiently high to melt an infinitesimal portion of the crystalline material in contact therewith. The heating of the electrode may be accomplished inductively, if desired, or a predetermined electric current may be caused to flow therein, from any convenient source, for a definite time-interval which depends upon the electrical resistance of the electrode and the rate at which the unfused crystalline material conducts heat away from the electrode and dissipates it.

The electrode itself may be metallic or it may be constituted by a layer of suitable conductive material that has been sprayed or otherwise caused to adhere to the surface of the crystal section from a suspension medium that is dissipated or otherwise removed before the "welding" operation. It is desirable that the electrode be quite free from water or any other liquid that would be converted into vapor during the operation, in order that a perfect weld may be obtained. Lead foil or a thin layer of evaporated lead is a good electrode material as it is a sufficiently good electrical conductor for most transducer applications and it has a high coefficient of thermal expansion. A high coefficient of thermal expansion is beneficial because the piezoelectric material usually has a high coefficient and the nearer alike the coefficients are the fewer crystals will be broken due to quick thermal changes and to thermal strains remaining in the electroded plate after it has cooled.

Preferably, during the heating operation, a certain amount of pressure is exerted upon the electrode to insure uniform adhesion thereof to the surface of the section. The energy supplied may be controlled by a conventional timing device, or the discharge from a condenser may be utilized as is the case in certain metal welding processes.

It probably would be assumed, in advance, by those familiar with fusible piezoelectric material, that the sections would be damaged by heat from the electrode. By experiment, however, it has been established that no detrimental changes occur if the heating is momentary and is just sufficient to cause fusion of a minute layer of the section or sections in contact with the electrode. The method of the invention is in some respects analogous to the disclosure in the United States patent to Paul Pfundt, No. 2,168,943, but it goes farther than the patented procedure in that, through its practice, the steps involved in providing the crystal sections with individual electrodes are eliminated, and that the plates may be intimately joined substantially throughout the area of a pair of electrode faces.

It might also be assumed from the foregoing that the invention is limited in its application to Rochelle salt sections. Such is not the case, however, inasmuch as it may be applied to substantially any fusible piezoelectric material, such as a mixed tartrate of sodium or rubidium, crystalline primary ammonium phosphate, primary potassium or sodium phosphate, isomorphous mixtures of phosphates, primary arsenates, etc., with satisfactory results.

The novel features considered characteristic of the invention are set forth with particularity in the appended claims. The invention itself, however, both as to its organization and its method of operation, together with additional objects and advantages thereof, will best be understood from the following description of certain specific embodiments, when read in connection with the accompanying drawings, in which:

Figure 7 shows another device utilizing inductive heating in practicing my invention.

Figure 8 is a view looking endwise at the device shown in Figure 7.

Figure 9 is a diagrammatic view showing a device for electrostatically heating a crystal.

Figure 10 shows a stack of crystal plates prepared for processing by my invention.

Figure 11 shows the stack of plates after they have been processed by my invention and their leads connected together, and Figure 12 illustrates, by an enlarged view, a particularly good electrode for a crystal.

In all figures of the drawings, equivalent elements are similarly designated.

Figure 1:
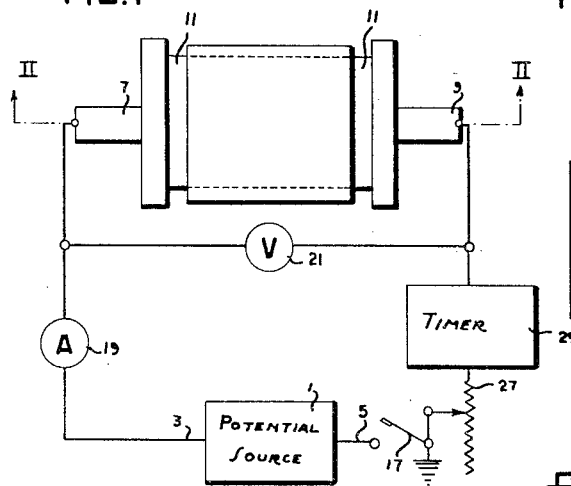
Figure 1 is a diagrammatic view exemplifying one mode of practicing the invention.
Figure 2:
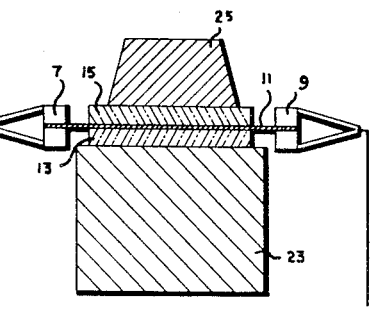
Figure 2 is a view in vertical cross-section, taken along a line corresponding to the line II—II in Figure 1.

Referring now to Figures 1 and 2 of the drawings, apparatus for practicing the invention may include an alternating or unidirectional potential source 1 from which a plurality of conductors 3 and 5 extend. The conductors terminate in spring clips 7 and 9, respectively, which may be clamped to the projecting extremities of a metallic electrode 11 interposed between a bottom section 13 of fusible piezoelectric material and a top section 15 of similar material. A master switch 17 and an ammeter 19 may be included serially in the circuit and a voltmeter 21 may be connected across the spring clips, as shown. A supporting device, such as a block 23 of heat conducting material or the like, is provided for the crystal sections and appropriate means, exemplified by a weight 25, are provided for urging the sections into contact with the intermediate electrode. Preferably, though not necessarily, the pressure means is heat-conductive but care must be exercised to prevent the sections from cracking during the welding operation because of too rapid conduction of heat away therefrom.

For the purpose of limiting the current to a safe, predetermined value, a rheostat 27 may be included in the circuit and the time during which the current flows may be controlled by employing an automatic time switch 29 such, for example, as the switch sold under the trademark "Mark Time."

The electrode 11 itself may be a strip of metallic foil having a thickness of the order of .0005 to .015 of an inch. It has been found that lead, indium, aluminum, silver, nickel and plated iron or steel are the most suitable electrode materials, but the invention, obviously, is not limited to their use alone, as other metallic foils and alloys may be utilized. Further, the use of sprayed or evaporated metals and alloys is contemplated, and it is also within the scope of this invention to use layers of different metals such, for example, as a thin layer of lead in intimate contact with the crystal and then a layer of indium in contact with the lead. An outside layer of lead may then be put on the indium layer. By this composite electrode structure good electrical conductivity can be achieved together with good thermal expansion properties. Also, upper and lower outer electrodes (not shown) may be affixed to the crystal sections at the same time, or a single, relatively stiff restraining and supporting electrode (not shown) may be affixed to the face of a single piezoelectric section, if desired, according to this invention.

It is difficult to give specific values for the current necessary for a satisfactory weld, or to state the length of time the current should flow in any given instance. These factors can be determined only by experiment, inasmuch as they depend upon the resistance and thickness of the electrode material, the dimensions of the crystal sections and upon the particular piezoelectric material utilized. It is considered preferable, however, to heat the electrode momentarily to a temperature slightly above the melting point of the crystalline material, say 60° to 90° centigrade in the case of Rochelle salt, rather than to heat it to a lower temperature for a longer time, in order that fusion of the piezoelectric material may be confined to the layer thereof immediately in contact with the said electrode and damage to the section be prevented. It is also hard to specify the exact frequency at which the induction heating device should operate, but in general the range is from 1 to 15 megacycles for electrodes of lead, indium, tin, silver, aluminum, etc., which are on the order of .001" to .002" thick. The thinner the electrode the higher the frequency should be, and the higher the resistance the higher the frequency should be.

After having determined, by experiment, the current and time interval required for satisfactory operation with crystal sections of a certain size and thickness, the actual method is very simple. A section is placed upon the support, a conductive layer, or electrode is deposited upon the upper face of the section, a second section is superimposed upon the electrode and pressure is applied to the stack. The clips are next applied to the projecting extremities of the electrode and the time switch, assuming that the master switch has been closed previously, is actuated to supply the predetermined potential to the electrode for the time interval that has been found expedient.

If one or more outer electrodes are simultaneously applied, for the purpose of completing a multiplate flexing element, or a stack of expander elements at a single operation, the method, with appropriate adjustment of potential, is substantially the same.

Figure 3:
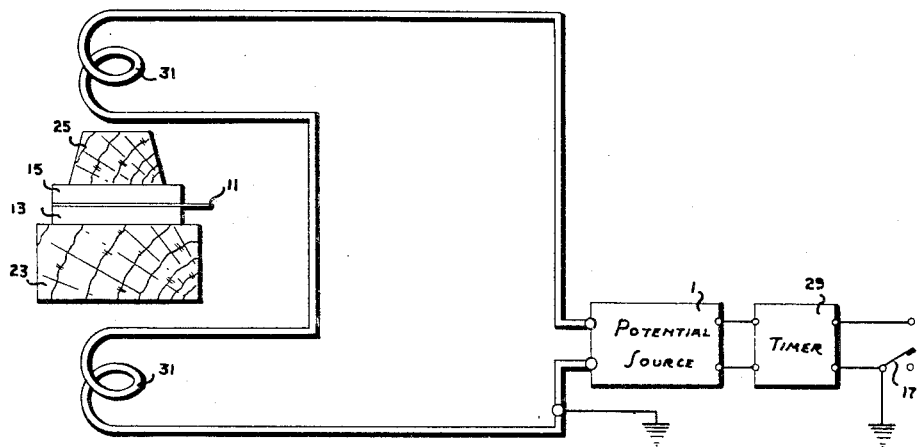
Figure 3 is a diagrammatic view exemplifying the utilization of inductive heating in practicing the invention.

The invention, as exemplified by Figures 3, 7 and 8 of the drawings, may be practiced by heating the electrode inductively instead of by passing a current directly through it. In that case, the potential source 1 may be an oscillator and power amplifier that supplies current to one or more coils 31, adjacent to which or within which the sections to be electroded are supported during the heating operation. When employing inductive heating, the master switch and the time switch had best be included in the primary power-supply circuit, for safety reasons, and water may be circulated through the coil 31 in order to keep the coils at a reasonably low temperature. A water inlet 4 and an outlet 6 are provided in the coil 31. I have found that the most uniform results are obtained when the axis of the coil 31 is parallel to or substantially parallel to the plane of the electrodes which are to be heated, as is shown in Figures 7 and 8.

In Figures 7 and 8 there is shown a belt 32, which may be endless, passing through the coil 31. A plurality of stacks of crystal plates 13, 15 which have an inner electrode 11 and which may have outer electrodes 12 are placed on the belt 32. A phenolic condensate material such as a "Bakelite" support 33 may be held within the coil 31 by any supporting means (not shown) for helping to provide a flat supporting surface for the stack of crystals. The weight 25 serves to hold the various electrodes 11 and 12 flat and in intimate contact with the faces of the crystal plates during the heating process.

Naturally, if inductive heating is utilized, the supporting means for the sections and the means for supplying pressure thereto are non-metallic.

Figure 4:
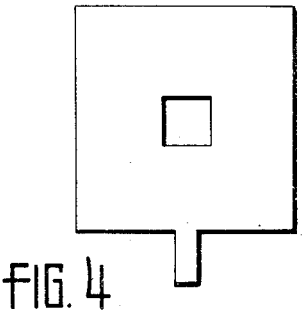
Figures 4, 5 and 6 are plan views of metallic electrodes of various types with which the invention may be practiced.
Figure 5:
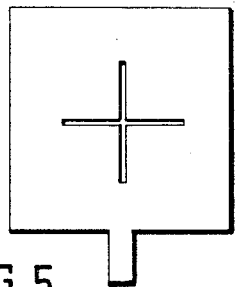
Figure 6:
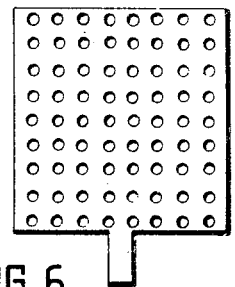

Although it has been found that the crystal sections may be welded quite firmly to a plain electrode or electrodes, somewhat more durable multiplate flexing or expander elements may be made if the electrodes are provided with perforations, as shown in Figures 4, 5 and 6, or if a section of fine mesh metallic screen (not shown) or the like is employed as an electrode. If foraminous electrodes are employed, the fused material flows through the openings, from the crystal section faces, which material, after solidifying, constitutes an autogenous weld. The capacity of the finished transducer is lessened, of course, by the perforations but the power-handling capability of the device is enhanced.

I have found that pre-heating the crystal plates prior to inductively heating them serves to reduce breakage due to thermal stresses. The heating may be done in a variety of ways, such as by low temperature ovens, electrical resistance wires, lamps, and the like, but I prefer to use electrostatic heating as it is quick and more readily lends itself to uniform mass production methods. Thus, for example, an electrostatic heating device, later to be described in detail, could be positioned to heat the crystal plates as they travel on the endless belt 32 just before they reach the inductance heater 31. A practical mass production installation utilizes an endless metallic belt or chain to carry the crystal plates past the electrostatic heater, and utilizes a belt 32 made of a dielectric material for carrying the crystal plates through the inductance coil 31.

The electrostatic heating device is shown in Figure 9, and comprises a pair of spaced plates 8 and 10 connected to a potential source 14 alternating in the neighborhood of 1 to 15 megacycles. A timer 16 may be utilized for controlling the heating interval, as in the inductance heating device shown in Figure 1. An endless metallic belt 18 passes between the spaced plates 8, 10 and carries a succession of crystal plates 13, 15 interleaved with electrodes 11, 12. The crystal plates are electrostatically heated to a temperature which approaches the temperature to which the induction heating process raises portions of the plate, but not to such a temperature that the piezoelectric properties are destroyed. The stack of plates is then transferred to the belt 32, which is made of a dielectric material, and the electrodes 11 and 12 are inductively heated to cause localized heating of the crystal material to the melting point.

Figure 10 illustrates a stack of plates, either of the expander type or of a type suitable for making a flexing element, temporarily connected together prior to the electrostatic and induction heating processes. The crystal plates 40, 41, 42, and 43 are interleaved with electrodes 44, 45, 46, and have outer electrodes 47, 48. A first "Bakelite" plate 50 is applied to the top of the stack and a second "Bakelite" plate 51 is applied to the bottom of the stack, and the whole is held together by three rubber bands 52, the "Bakelite" plates serving to hold the electrodes flat and in intimate contact with the adjacent crystal plates. The electrode extensions or leads 53 are not connected together. The assembly is ready for the electrostatic and induction heating processes, and after it has been treated the "Bakelite" plates are removed and the leads may be connected together as shown in Figure 11. If the electrodes had been electrically connected together during the electrostatic heating process the crystal plates would have been shielded and the heating would have been materially reduced. Reference character 49 indicates the crystalline material which melted during the heating process and which flowed into the space around the edges of the electrode, thereby more effectively connecting the several plates together at their edges.

Figure 12 illustrates a particularly good electrode for use with piezoelectric materials as it reduces the frequency at which the induction heating device must operate to weld an electrode of a given thickness to the crystal.

It has been found that materials with good electrical conductivity, such as aluminum and silver, do not have coefficients of thermal expansion which closely match the coefficients of thermal expansion of piezoelectric materials, such as Rochelle salt and primary ammonium phosphate, and because materials such as aluminum and silver have a high modulus of elasticity they tend to crack Rochelle salt piezoelectric plates upon a change in temperature. An ideal electrode material, therefore, is one which meets the following requirements: it has a high coefficient of electrical conductivity, it has a low elastic modulus, and it has a coefficient of thermal expansion which matches the coefficient of thermal expansion of the particular crystalline material to which it is to be attached. This latter requirement cannot be met entirely as many of the crystalline materials have different thermal coefficients in different directions. For example, in Rochelle salt crystalline material, the coefficients of thermal expansion along the X, Y and Z crystallographic axes are respectively .00006, .000038, and .000045 inch per inch per degree Centigrade, and in primary ammonium phosphate it is .000033 inch per inch per degree Centigrade along the X and Y axis directions and only .000005 inch per inch per degree Centigrade along the Z axis direction.

Alloys can be made which approach the ideal electrode material, such, for example, as a lead-indium alloy, the indium being used because it has a high thermal coefficient of expansion and a low elastic modulus, and the lead being utilized to reduce the cost of the material.

Figure 12 illustrates a section 55 of a piezoelectric crystal to which has been applied a thin layer 56 of material such as aluminum. Over the aluminum layer 56 there is applied a thin layer 57 of indium or lead, and over the indium or lead layer 57 there is a second layer of aluminum. The total thickness of these three layers may be on the order of .0015 inch.

Because the aluminum 56 has a high coefficient of electrical conductivity it is applied directly to the face of the crystal 55 in a manner to assure intimate contact, i. e. by evaporation. The thermal coefficient of expansion of aluminum does not closely match the thermal coefficients of expansion of crystalline materials, and because of this mis-match and the high modulus of elasticity of aluminum it is apt to crack the crystal unless the layer thereof is very thin. For these reasons only a thin layer of aluminum is applied but this thin layer is valuable because of its high electrical conductivity. In order to obtain sufficient electrode thickness that a current of practical value can be induced in it without going to excessively high frequencies I apply a layer 57 of lead, indium, cadmium, or the like to the thin layer 56 of aluminum. The material comprising this second layer 57 does not have as high a coefficient of electrical conductivity as the layer 56 (which may also be of gold or silver) but its thermal coefficient of expansion more nearly matches the thermal coefficients of the crystalline material, and its modulus of elasticity may be low, thereby materially reducing the probability of cracking the crystal. In order for the induction heating process (as exemplified by Figures 7, 8) to be most effective an electrical current path of low resistance should be provided. For this reason a thin layer 58 of aluminum, gold, or silver is applied to the outer face of the layer 57. The induced currents will travel primarily through layers 56 and 58. For some applications where thicker electrodes can be tolerated all lead or all indium electrodes may be used but for other applications both lead and indium have an electrical conducivity which is too low. A particularly good electrode and lead construction is achieved by utilizing the laminated structure shown in Figure 12 and by having the middle electrode layer integral with the lead extension. Thus melting of the lead extension is obviated.

When the electrode is made of the same material as the lead which extends away from the crystal the induction heating process is apt to melt the lead away unless the lead is made thinner than the electrode. Thus reduction in thickness reduces the heating in the lead, and consequently there is less danger of melting.

Another manner in which the danger of melting the lead can be obviated is to make the lead of a material which has a lower electrical conductivity.

It will be apparent from the foregoing that the new and improved method, disclosed herein, reduces the number of manual operations heretofore considered necessary in fabricating a multiplate flexing element and, as one result, enable a reduction in factory cost. At the same time, the piezoelectric transducers produced thereby have many desirable characteristics unobtainable by methods heretofore known.

The inventor is fully aware of the fact that numerous modifications of the disclosed method will be apparent to those skilled in the art, all within the scope of the invention. The invention, therefore, is not to be limited except insofar as is necessitated by the prior art and by the spirit of the appended claims.

What is claimed is:

1. The method of electroding the surface of a section of fusible piezoelectric material, that comprises applying to said surface a layer of electrically conductive material, preheating said section of piezoelectric material to a temperature above room temperature but below the temperature at which the piezoelectric action is permanently impaired, positioning an induction heating coil in electromagnetic energy transfer relationship with the said layer of electrically conductive material and with the axis of the coil substantially parallel to the plane of the layer of conductive material, passing alternating current through said coil to cause said layer to be heated to a temperature sufficiently high to cause fusion of the piezoelectric material immediately adjacent thereto and discontinuing the heating before damage is done to the remainder of the section, whereby said layer is intimately bonded to the section to constitute an electrode therefor.

2. The method as set forth in claim 1 further characterized in this: that said section of piezoelectric material is electrostatically heated prior to the said layer being inductively heated.

3. The method of electroding a multiplate piezoelectric crystal element comprised of a plurality of plate-like sections of fusible piezoelectric crystal material in face-to-face relationship with electrically conductive electrode means interposed between the plates and positioned on the two outside major faces of said multiplate element that comprises: positioning an induction heating coil in electromagnetic energy transfer relationship with the said electrode means, passing alternating current through said coil to cause said electrode means to be heated to a temperature sufficiently high to cause fusion of the piezoelectric material immediately adjacent thereto and discontinuing the heating before damage is done to the remainder of the section, whereby said electrode means is intimately bonded to the section, and subsequent to said heating electrically interconnecting the electrode means on the said two outside major faces of said multiplate element.

4. The method of electroding a multiplate piezoelectric crystal element comprised of a plurality of plate-like sections of fusible piezoelectric crystal material in face-to-face relationship with electrically conductive electrode means interposed between the plates and positioned on the two outside major faces of said multiplate element that comprises: positioning an induction heating coil in electromagnetic energy transfer relationship with the said electrode means and with the axis of the coil substantially parallel to the plane of said electrode means, passing alternating current through said coil to cause said electrode means to be heated to a temperature sufficiently high to cause fusion of th piezoelectric material immediately adjacent thereto and discontinuing the heating before damage is done to the remainder of the section, whereby said electrode means is intimately bonded to the section, and subsequent to said heating electrically interconnecting the electrode means on the said two outside major faces of said multiplate element.

5. The method of electroding a multiplate piezoelectric crystal element comprised of a plurality of plate-like sections of fusible piezoelectric crystal material in face-to-face relationship with electrically conductive electrode means interposed between the plates and positioned on the two outside major faces of said multiplate element that comprises: positioning an induction heating coil in electromagnetic energy transfer relationship with the said electrode means and with the axis of the coil substantially parallel to and substantially in the plane of said interposed electrode means, passing alternating current through said coil to cause said electrode means to be heated to a temperature sufficiently high to cause fusion of the piezoelectric material immediately adjacent thereto and discontinuing the heating before damage is done to the remainder of the section, whereby said electrode means is intimately bonded to the section.

CHARLES K. GRAVLEY.

REFERENCES CITED

The following references are of record in the file of this patent:

UNITED STATES PATENTS

| Number | Name | Date |
| --- | --- | --- |
| 1,572,352 | Ewalt | Feb. 9, 1926 |
| 2,282,317 | Bennett | May 12, 1942 |
| 2,388,242 | Arndt | Nov. 6, 1945 |
| 2,393,429 | Swinehart | Jan. 22, 1946 |
| 2,423,922 | Arndt | July 15, 1947 |

FOREIGN PATENTS

| Number | Country | Date |
| --- | --- | --- |
| 575,063 | Great Britain | Feb. 1, 1946 |